(12) United States Patent
Hoernicke et al.

(10) Patent No.: US 12,025,966 B2
(45) Date of Patent: Jul. 2, 2024

(54) APPARATUS COMPRISING A PROCESS CONTROL SYSTEM AND AT LEAST ONE PROCESS MODULE, RELATED METHOD, COMPUTER PROGRAM PRODUCT, AND DATA PROCESSING DEVICE

(71) Applicant: ABB Schweiz AG, Baden (CH)

(72) Inventors: Mario Hoernicke, Landau (DE); Katharina Stark, Weinheim (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/169,567

(22) Filed: Feb. 8, 2021

(65) Prior Publication Data

US 2021/0165386 A1 Jun. 3, 2021

Related U.S. Application Data

(63) Continuation of application No. PCT/EP2019/071119, filed on Aug. 6, 2019.

(30) Foreign Application Priority Data

Aug. 9, 2018 (EP) .................................... 18188231

(51) Int. Cl.
G05B 19/05 (2006.01)

(52) U.S. Cl.
CPC ......... *G05B 19/058* (2013.01); *G05B 19/054* (2013.01); *G05B 19/056* (2013.01)

(58) Field of Classification Search
CPC .. G05B 19/054; G05B 19/056; G05B 19/058; G05B 19/4185; G05B 2219/32287
USPC ........................................................... 700/18
See application file for complete search history.

(56) References Cited

U.S. PATENT DOCUMENTS

| | | | |
|---|---|---|---|
| 6,192,397 B1* | 2/2001 | Thompson | H04J 3/0641 709/209 |
| 2007/0038426 A1 | 2/2007 | Fu et al. | |
| 2013/0074031 A1* | 3/2013 | Birze | G05B 19/0423 717/100 |
| 2013/0178970 A1* | 7/2013 | Cachapa | G05B 19/41875 700/108 |

(Continued)

FOREIGN PATENT DOCUMENTS

| | | |
|---|---|---|
| CN | 101256399 A | 9/2008 |
| CN | 102193543 A | 9/2011 |

(Continued)

OTHER PUBLICATIONS

T. Holm, Engineering method for the integration of modules into fast evolving production systems in the process industry, Aug. 2015, IEEE International Conference on Automation Science and Engineering (CASE) (Year: 2015).*

(Continued)

*Primary Examiner* — Christopher W Carter
(74) *Attorney, Agent, or Firm* — Leydig, Voit & Mayer, Ltd.

(57) ABSTRACT

An apparatus includes: a process control system; at least one process module; and a process module logic entity associated with the at least one process module. The process control system communicates with the at least one process module via a process module interface. The process module logic entity provides a control logic of the at least one process module.

7 Claims, 6 Drawing Sheets

(56) References Cited

U.S. PATENT DOCUMENTS

| | | | |
|---|---|---|---|
| 2015/0301522 A1* | 10/2015 | Ochs | B01J 19/004 700/266 |
| 2018/0039261 A1* | 2/2018 | Haller | G05B 23/0267 |
| 2018/0113430 A1* | 4/2018 | Naidoo | G05B 19/41815 |
| 2018/0114414 A1* | 4/2018 | Law | G05B 23/0272 |
| 2019/0041831 A1* | 2/2019 | Albers | G05B 19/4183 |

FOREIGN PATENT DOCUMENTS

| | | |
|---|---|---|
| CN | 102740948 A | 10/2012 |
| CN | 102880123 A | 1/2013 |
| CN | 103814501 A | 5/2014 |
| CN | 105324728 A | 2/2016 |
| EP | 3318935 A1 | 5/2018 |
| JP | 2000-163456 A | 6/2000 |

OTHER PUBLICATIONS

ABB, "ABB launches world's first commercial modular enabled process automation solution," ENP Newswire, Jun. 2018, pp. 1-2, ABB, Frankfurt, Germany.

Huang, "Application of SCAN3000 Distributed Control System in Qilin Cement Plant," *Fujian Building Materials*, 4 pp. (Sep. 30, 2006).

Li et al., "Rare-earth Extraction Process Control System," *Control Engineering of China*, 11(2): 146-148 (Mar. 20, 2004).

Qian et al., "Design and Application of Computer Simulation Platform in Process Industry Process Control," *Automation & Instrumentation*, 12: 6 pp. (Dec. 15, 2012).

Yu et al., "A SERCOS-Based Distributed Control System," *Industry Control and Applications*, 27(3): 44-47 (Dec. 31, 2008).

China National Intellectual Property Administration, Notice to Grant in Chinese Patent Application No. 201980053028.2, 7 pp. (Apr. 17, 2024).

\* cited by examiner

APPARATUS COMPRISING A PROCESS CONTROL SYSTEM AND AT LEAST ONE PROCESS MODULE, RELATED METHOD, COMPUTER PROGRAM PRODUCT, AND DATA PROCESSING DEVICE

CROSS-REFERENCE TO PRIOR APPLICATION

This application is a continuation of International Patent Application No. PCT/EP2019/071119, filed on Aug. 6, 2019, which claims priority to European Patent Application No. EP 18188231.7, filed on Aug. 9, 2018. The entire disclosure of both applications is hereby incorporated by reference herein.

FIELD

The present disclosure relates generally to an apparatus comprising a process control system and at least one process module, to a method related to such an apparatus, to a computer program product relating to such an apparatus and to such a method, and to a data processing device relating to such an apparatus and to such a method.

BACKGROUND

Process engineering plants such as chemical engineering plants or plants in production processes for the pharmaceutical industry typically comprise a plurality of process modules that are combined in a convenient manner to obtain the desired process. In general, modularization by means of such process modules may help to produce chemical or pharmaceutical products in customized processes in an economic manner and even in smaller amounts.

A process module provides one or more module-specific services, or process functions, such as temperature control, dosing, stirring etc. A process module may expose an interface for communication with a higher-level system. The interface details, such as the kind of communication with the specific module, command syntaxes for receiving instruction commands, and a signaling scheme for providing the higher-level system with return information, are contained in a module type package (MTP). An MTP is usually a machine-accessible description file of the process module, typically a file having a markup structure such as an XML file, an AML/CAEX file or the like, or a simpler structure such as JSON or the like.

In the higher-level system (a process control system, e. g. a SCADA system), a plurality of process modules can be linked to one another to obtain a combination of the respective services of the process modules involved. By such a combination, or orchestration, a sub-process or an entire process of the intended product is obtained.

Each process module exposes its interface or interfaces to the process control system; yet it comprises its own module control system that takes care of the automation of the process module. In order for the process module to perform a specific task in the orchestrated services, it needs to be configured and the control code for a specific automation function or service function has to be engineered. As even the process modules that provide similar functions but are manufactured by different vendors vary, the target-specific control codes usually differ from one another. Hence, the target-specific control code can only be used within the specific module that it was designed for.

SUMMARY

In an embodiment, the present invention provides an apparatus, comprising: a process control system; at least one process module; and a process module logic entity associated with the at least one process module, wherein the process control system is configured to communicate with the at least one process module via a process module interface, and wherein the process module logic entity provides a control logic of the at least one process module.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
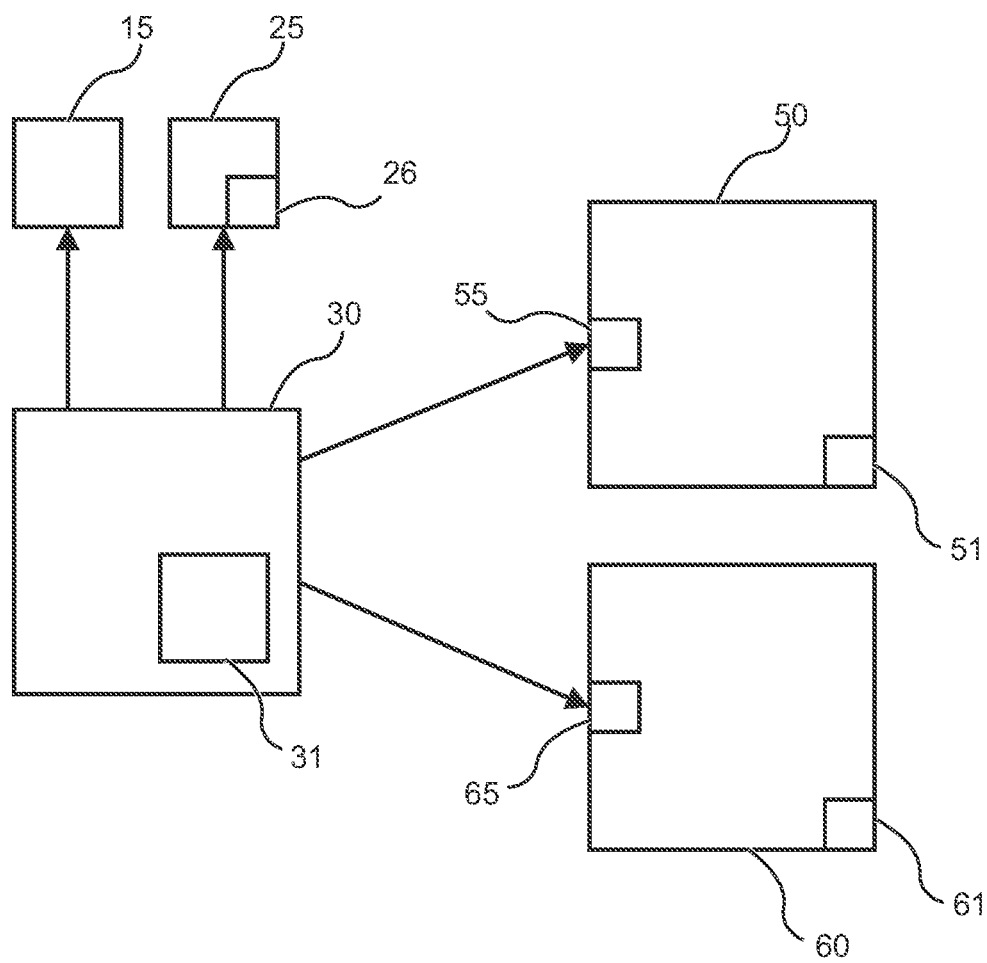
FIG. 1 is a schematic diagram of an engineering tool environment for parts of an apparatus according to an embodiment.

In an embodiment, the present invention provides a process control system that thus only has information on the service or services that a specific process module can carry out, and the information that is obtainable by accessing the process module's interface. In an embodiment, the present invention improves the interaction between a process control system and one or more process modules controlled by the process control system, particularly to make the interaction more flexible.

According to an aspect, an apparatus comprises a process control system and at least one process module, the process control system being configured to communicate with the at least one process module via a process module interface. The apparatus further comprises a process module logic entity associated with the at least one process module. The process module logic entity provides a control logic of the process module.

Typically, the process module logic entity provides the control logic of the process module to the process control system, to an analysis system linked with the process control system, to an orchestration system linked to the process control system or running the process control system, or the like.

The process module interface may comprise as little as a basic interface function, such as a simple input/output function (e. g., a "select" terminal) and a measuring device (e. g., a field instrument etc.). The process module interface may, however, also comprise an extended interface function, such as an interface provided by one or more module-dedicated controllers (e. g., a Programmable Logic Controller, PLC) connected to and controlling actuators of the process module and/or measuring devices (e. g., field instruments etc.). The different functionalities or complexities of process module interface will be referred to as process module interface degree. Typically, the process module interface degree reflects a process module complexity, e. g. a number of services or a heterogeneity of different services a process module can carry out. An example of a process module having a comparably low complexity is a small pump module; an example of a process module having a comparably high complexity is a process module combining services such as heating, stirring, and pumping.

According to an aspect, a method comprises providing an apparatus or providing a model of an apparatus, the apparatus comprising a process control system and at least one process module, the process control system being configured to communicate with the at least one process module via a process module interface, the apparatus further comprising a process module logic entity associated with the at least one process module, the process module logic entity providing a control logic of the process module to the process control system; and reflecting the control logic of the process module in a procedure, typically in a diagnosis procedure or in a configuration procedure.

In embodiments, the method is a diagnosis procedure, comprising Operating the apparatus; Mapping at least one process module value obtained through the process module interface to a corresponding part of the control logic of the process module; and Presenting the control logic of the process module including the mapped process module value.

Typically, the control logic including the mapped process value is presented, e. g. to an operating or maintenance person, by means of a graphical user interface (GUI) on a display means. The display means may be a virtual display, such as a software display interface or a hardware display interface providing display data containing the GUI. The display means may be a physical display such as a screen or the like. The apparatus may comprise the display means for presenting the graphical user interface. In embodiments, the GUI comprises an interlock viewer.

In embodiments, the process module value is used to identify a state, typically the current state, in a state model of the process module. Typically, the current state is presented, e. g. in the GUI. In addition to the current state, for example, one or more states subsequent to the current state may also be presented for orientation. Typically, the one or more states that are subsequent to the current state and that are presented are states that are possible to become the current state in the future, the possibility being dependent on characteristics of the current state. A state may comprise a sequence, or function, of a service provided by the process module. The sequence or function is finished at some point in time, either by the control logic or by an operating or maintenance person, and invokes a state transition to a successor state.

By the method according to the diagnosis procedure, a source of an error or a misbehavior of the apparatus may be identified as belonging to the process module or to the process control system. An operating person performing the diagnosis may be presented with control logic, where the process module value or the process module values is/are mapped to the control logic. This is in contrast to the conventional technology, where only an interface of the process module(s) is exposed, and the control logic is inaccessible. Even if the presentation of the control logic does not necessarily make the actual control code that is running on the process module accessible, the presentation of the control logic may be annotated by the operating person conducting the diagnosis and be sent to the process module vendor in order to fix failures stemming from the actual control code.

In embodiments, in the method according to the diagnosis procedure, the operated apparatus comprises a plurality of process modules; a respective process module value or respective process module values is/are mapped to a corresponding part of the control logic of multiple or all of the plurality of process modules; and the control logic of multiple or all process modules is presented. Again, the presentation may be performed via the GUI. This may help to identify a particular process module that causes an error or does not behave as expected.

According to an aspect, the method is a configuration procedure, comprising Determining a process module interface degree of the at least one process module; and, according to the determined process module interface degree, Implementing control functions corresponding to the control logic of the process module in the process control system.

Typically, when it is determined that the process module interface degree relates to a basic interface function, the control functions corresponding to the control logic of the process module are implemented in the process control system; and when it is determined that the process module interface degree relates to an extended interface function, it is assumed that the process module itself provides control functions, such that there is no need to implement the control functions in the process control system.

In embodiments, in the method according to the configuration procedure, the apparatus comprises at least two process modules, wherein at least one process module has a basic interface function, and wherein at least one process module has an extended interface function. A process module logic entity may only be present or provided for the process module having the basic interface function.

Typically, the control logic is control code agnostic, i. e. it does not depend on a certain type or format of target-specific control code for the process module. As such, the format of the control logic is the same even for different process modules of the same kind, such as similar process modules providing the same services or providing similar services but obtainable from different vendors.

In embodiments, the process module logic entity is a control logic description contained in or linked to a module type package (MTP) for the respective process module, such as an MTP information. An MTP information may be an MTP file or an MTP database entry. The MTP information may be markup language-based, such as AML-based, CAEX-based or the like, but not limited thereto. In embodiments, a markup language-based MTP information is extended by the control logic description. Alternatively or additionally, in embodiments, a markup language-based MTP information may contain a link to a separate information, the separate information being a file or a database or database entry separate from the MTP information.

In embodiments, the process control system is part of an orchestration system for a modular plant. Alternatively, the process control system is executed on a system different from the orchestration system. The system may be a stand-alone computer, such as a PC or an industrial computer. The system may also include that at least a part of the system is executed as a cloud computing-based service, such as a system-as-a-service, an application-as-a-service or the like.

A further aspect of the present disclosure relates to a computer program product for providing a computer-assisted herein-described diagnosis procedure or a herein-described computer-assisted configuration procedure of an apparatus as described herein or of a model of an apparatus as described herein. Concerning the computer program product, the computer program product comprises a nonvolatile data storage medium. The data storage medium includes instructions that, when loaded into a computer and executed thereon, make the computer conduct the method as described herein, typically the method according to the diagnosis procedure or the method according to the configuration procedure.

Yet a further aspect of the present disclosure relates to a data processing device for providing a computer-assisted diagnosis procedure or a computer-assisted configuration procedure of an apparatus as described herein or of a model of an apparatus as described herein. The data processing device comprises a human machine interface, such as a graphical user interface. The data processing device further comprises a means for reflecting the control logic of the process module of the apparatus or of the model of the apparatus in the method according to diagnosis procedure as described herein or in the method according to the configuration procedure as described herein.

It is understood that any aspects, features, and advantages relating to or described in connection with any of the methods are also applicable to the computer program product carrying out the method and to the data processing device employed to carry out the method.

Any means of a data processing device may be provided in the form of processors, processing sub-units or any other appropriate processing device. In the data processing device, at least some of the means may be provided on a data storage medium or on multiple data storage media, wherein the means access the data on the data storage medium or media, e. g. in the form of computer-accessible instructions. The means may also include program code loaded into the means and executed by the means.

A human machine interface (HMI), as used herein, may comprise a display device, such as a screen. In embodiments, the software display interface or the hardware display interface of the apparatus may be logically or physically coupled with the HMI to provide the display data on the screen of the HMI. Preferably, an input device for receiving a user input, such as a mouse, a track ball, a track pen, a keyboard, a touch panel or the like is provided to the HMI.

The following describes embodiments of the present disclosure in a more detailed manner. It is understood that aspects, features and advantages of the embodiments can be combined with one another or omitted, as appropriate and as understood by the skilled person. In the following description, like reference numerals describe like functions that are applicable to all of the figures, and a repeated description of such like functions is abbreviated or omitted as appropriate.

Figure 2:
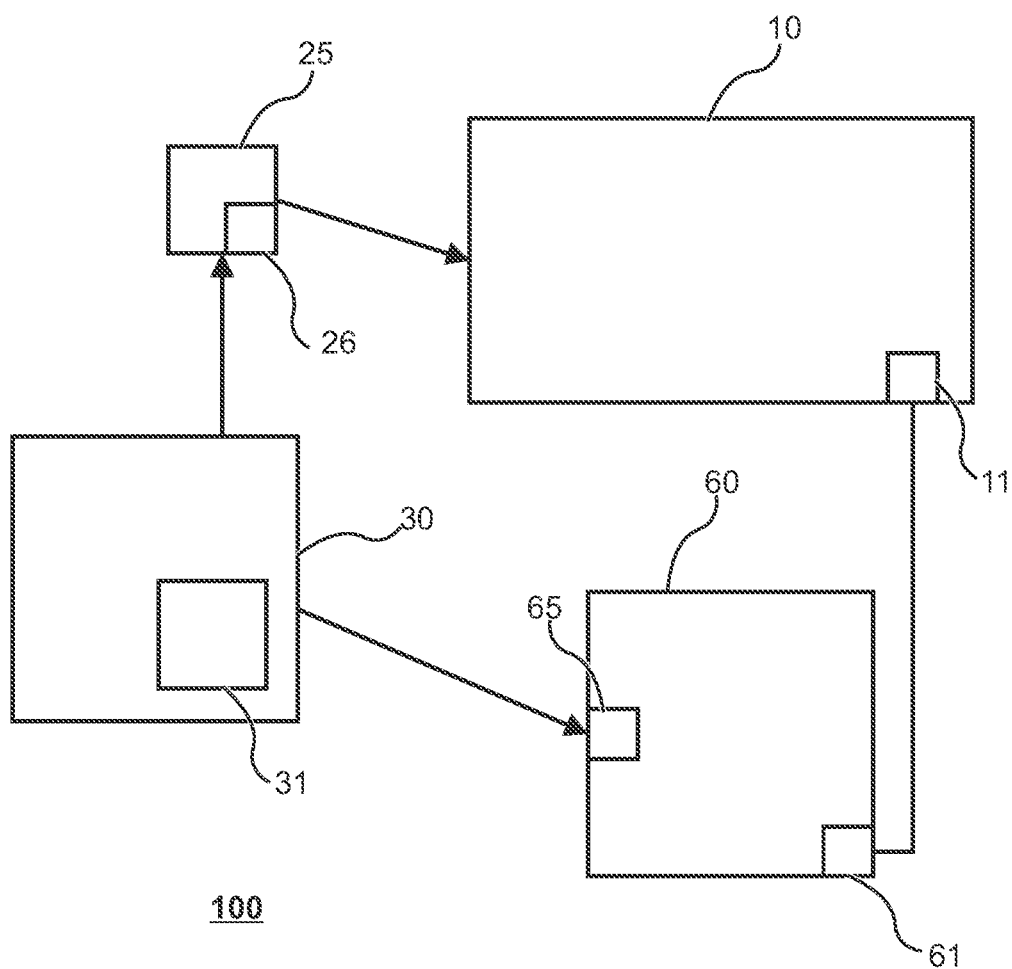
FIG. 2 is a schematic diagram of an apparatus according to an embodiment.
Figure 3:
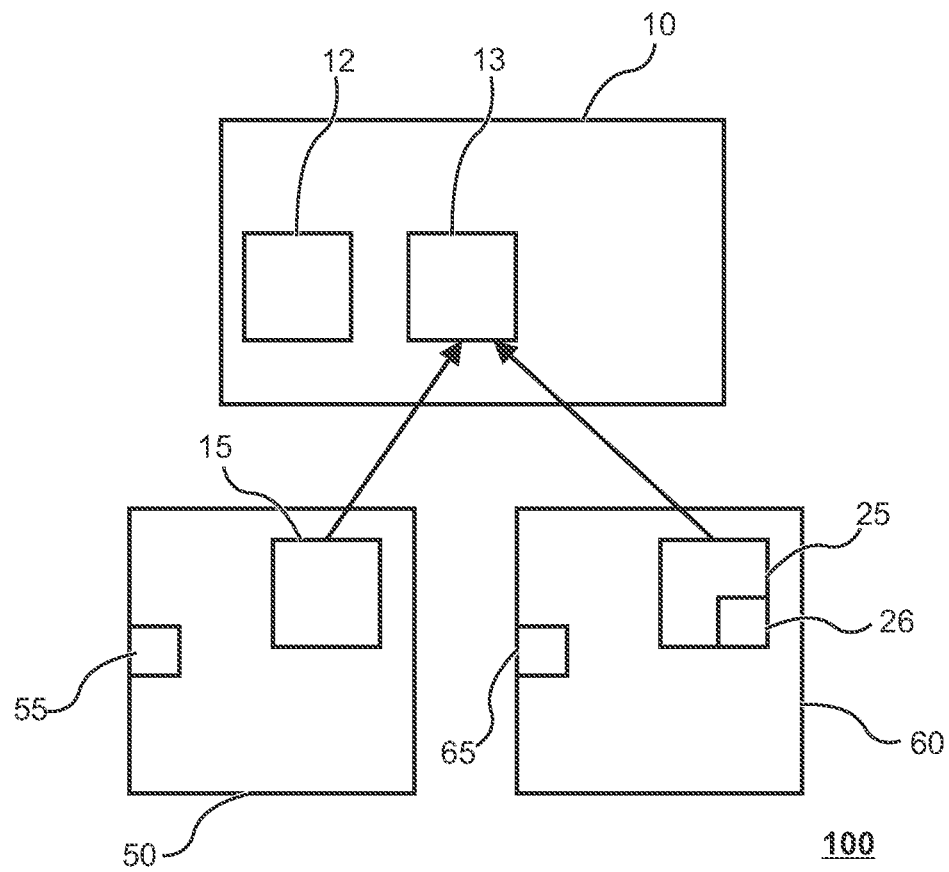
FIG. 3 is another schematic diagram of an apparatus according to an embodiment.
Figure 4:
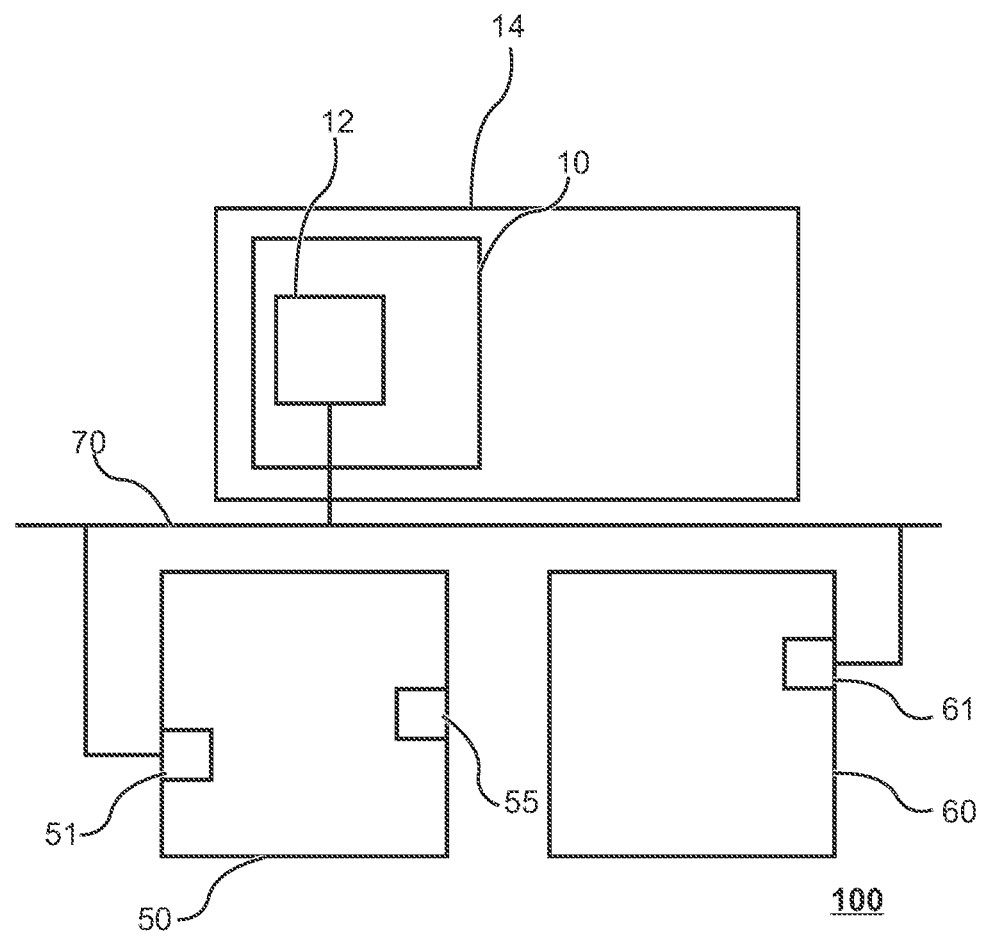
FIG. 4 is another schematic diagram of an apparatus according to an embodiment.

FIG. 1 shows, in a schematic manner, an engineering tool 30 for engineering some parts of an apparatus according to an embodiment of the present disclosure. FIGS. 2-4 show the apparatus 100 linked to some of the parts of FIG. 1. Here, aspects of both FIG. 1 and FIGS. 2-4 are described.

In FIG. 1, a first process module 50 and a second process module 60 are configured with the engineering tool 30. The process modules 50, 60 each provide module-specific services, or process functions, such as temperature control, dosing, stirring etc. In the process control system 10 of FIGS. 2-4, the engineering tool 30 can be executed and presented, via a graphical user interface (GUI) on a suitable human machine interface (HMI, to an operating person. The process control system 10 may be part of a higher-order system, such as an orchestration system 14 as shown in FIG. 4. The process module 50 comprises a process module interface 51 for module external communication, such as for communication with the process control system 10. Likewise, the process module 60 comprises a process module interface 61 for module external communication, such as for communication with the process control system 10.

By combining multiple process modules 50, 60 under the control of a process control system 10, a modular plant can be configured, e. g. a modular plant for a chemical or a pharmaceutical process. The basic idea of a modular plant is to create the plants overall functionality by assembling the plant from the plurality of suitable process modules 50, 60. The process modules 50, 60 may be directly physically connected (e. g., in the form of a physical input/output cascade) to one another, e. g. via a pipe for substances. However, the process modules 50, 60 may also be functionally connected to one another, e. g. via intermediation of further elements such as a tank or the like. The modules 50, 60 act together as process elements in the process, i. e. for example the chemical or pharmaceutical process. Each module 50, 60 may have its own automation system, as the modules 50, 60 may be provided by different vendors.

By means of the engineering tool 30, a target-specific control code 55 for the first process module 50 is created and transferred to the first process module 50. Likewise, with the engineering tool, another target-specific control code 65 for the second process module 65 is created and transferred to the second process module 65. Target specific, in this context, means that for different modules 50, 60 carrying out similar or like functions, the control codes 55, 65 may be structured or composed different from one another, e. g. due to different module-specific code execution properties.

The engineering tool 30 may be a neutral engineering tool that can be used for engineering multiple or all of the different-type control codes 55, 65 for the different modules 50, 60. An engineering procedure that employs a neutral engineering tool is target system independent. Yet, the control codes 55, 65 output by the neutral engineering tool are specific for the respective modules 50, 60, i. e., not mutually interchangeable. The neutral engineering tool may be equipped, for example, with target dependent plugins or the like for target system code generation.

The engineering tool 30 also creates an interface specification or interface description 15, 25 for each of the process modules 50, 60. An interface description 15, 25 comprises a specification of the respective process module interfaces 51, 61. The interface description typically specifies the interface details, such as the kind of communication with the specific module, command syntaxes for receiving instruction commands, and a signaling scheme. As an example, at least parts of the interface descriptions 15, 25 are in the form of a module type package (MTP), such as an MTP data file. The MTP typically describes one or more process functions of the corresponding process module 50, 60, e. g. how it works or operates, how it is visualized etc. Parts of the interface descriptions 15, 25 may already be part of a standard that a specific MTP employs. Other parts of the interface descriptions 15, 25, e. g. a functional interface description for activating certain process module functions, is part of the MTP and may refer to the parts in the standard. The interfaces 51, 61 are described for providing a way to control the automation system from a process control level, such as a SCADA system.

In an example, the MTP data file is a description file linked to the respective process module 50, 60 that it describes. Typically, the MTP file has a markup structure such as AML, CAEX or the like.

Each process module 50, 60 serves a certain process function or can be configured to serve a certain process function. A process step running on the process modules 50, 60 is automated using a small control system that takes care of the automation. The module-internal control system is configured by the control codes 55, 65, respectively. In the example shown in FIG. 1, a neutral control code 31 is engineered. The neutral control code 31 is module-specific in a meaning in that different process modules 50, 60 may provide different module or process functions, such as stirring, pumping etc. However, the neutral control code 31 is unspecific of an actual implementation that a certain process module 50, 60 uses in order to provide or achieve such module functions. For example, the neutral control code 31 for different process modules 50, 60 with the same or like (comparable) services, but provided by different vendors, is typically the same neutral control code 31 amongst the modules 50, 60. That is, the neutral control code 31 can be re-used for different modules 50, 60, e. g. code incompatible modules 50, 60 from different module vendors that provide the same or like services. From the neutral control code 31, the module-specific control codes 55, 65 are created.

The interface descriptions 15, 25 can be used in a process orchestration system, possibly running on the process control system 10, for the coordination between the different process modules 50, 60. However, the interface descriptions 15, 25 are not necessarily related to the control logic of the respective module 50, 60.

In the embodiment shown in FIG. 1, in addition to the interface description 25 for the process module 60, a process module logic entity 26 is provided. The process module logic entity 26 provides a control logic of the process module 60. It is noted that this description is only by way of example, and that multiple or all process modules 50, 60 may likewise be associated with a corresponding process module logic entity.

The control logic provided by the process module logic entity 26 is typically target system independent. In other words: Typically, the format of the control logic would be the same for different types of process modules 50, 60.

As an example, the process module logic entity 26 is an extension to the module type package (MTP) containing the interface description 25. In other words: The control logic provided by the process module logic entity 26 may be an extension of the MTP file, e. g. in the format of PLCOpenXML as a part of the AML standard. The control logic typically extends one or more cause and effect matrices in the MTP file. However, the control logic may also be added to the MTP file in another format, or it may be linked to the MTP file in another suitable manner, e. g. via a database entry, a file system entry or the like.

By providing the process module logic entity 26 belonging to a specific process module 60, the logic is exposed and accessible, making the process module 60 a white box from a control logic standpoint.

In FIG. 2, the process control system 10 is provided, via the engineering tool 30, with the interface description 25 and the process module logic entity 26 for the process module 60. The process module 60, in turn, is provided, via the engineering tool 30, with the specific control code 65. The process control system 10 is connected, via an interface 11, with the interface 61 of the process module 60.

In operation, a conventional process module would only expose its interface, which would make a diagnosis difficult in the case that the module was not working or behaving as expected. When conducting such a diagnostic, it is desirable to have access to the control logic, i. e. look into the running code, to fully understand the module or to look up e. g. an interlock. An interlock or interlock situation is typically a state in which a state transition into a successor state is not possible, i. e. blocked or locked, e. g. due to a configuration mistake. In bigger plants where different module vendors provide different types of modules from different vendors, such a diagnosis might not be easily accessible. Other, vendor-specific tools (multiple other, different tools originating from different module vendors) may be hard to learn to operate each, resulting in an increased amount of time spent to achieve the diagnosis result. Moreover, the vendor-specific tools may incur further license fees, an effort for tool installation on a PC or the like.

In the present configuration, however, a generic representation of the control logic of the process module 60 is provided via the process module logic entity 26. For example, a representation of the control logic, possibly having a process value mapped to a certain part of the control logic, can be provided via an orchestration system running on a GUI on the process control system 10. A mapped process value may be a live value obtained via the communication protocol that is used, for example OPC UA (Open Communication Protocol Unified Architecture). In an exemplary embodiment, the GUI may be the same engineering tool 30 as that one that is used in the orchestration system. Also, tools such as an interlock viewer may be used in connection with the exposed control logic.

In the diagnosis operation, the additional information from the MTP extension (the control logic exposed via the process module logic entity) may help an operating person, performing the diagnosis operation, in identifying a source of an error, e. g. a malfunctioning process module 50, 60, a malfunctioning orchestration layer and the like.

In FIG. 3, some elements of an apparatus 100 involved in an orchestration procedure of a plant are shown. In FIG. 3, the process control system 10 comprises an orchestration GUI 13 for process module orchestration, and a high-level controller 12.

In the module selection and orchestration process, the process modules to be used have to be chosen. Roughly, functionally big modules can be discriminated from functionally small modules. Functionally "big" need not necessarily mean that the physical dimensions of such a big module are large; but functionally "big" modules tend to have more functionality than small modules and can thus be orchestrated easily; in particular, big modules usually come with an internal controller, such as an internal PLC. On the other hand, functionally small modules have the advantage that they can be used flexibly. Conventionally, also for functionally small modules, a controller (a dedicated PLC) had to be provided for each small module. By the techniques described herein, small modules are possible that do not have an internal controller on their own.

By way of example, a small module 60, devoid of a dedicated controller, may have the interface 61 comprising only a basic interface function, such as a simple input/output function (without limitation, a "select" terminal) and a simple field instrument. Likewise, a big module 50 has an internal dedicated controller; thus, its interface 51 has an extended interface function that reflects an extended control logic.

As an approach, in FIG. 3, the process modules 50, 60 are engineered in a neutral format, and their respective target-specific control codes 55, 65 are generated. The interface description 15 for the big process module 50 is created as a standard (i. e., non-extended) MTP file. The interface description 25 for the small process module 60 is created as an MTP file having the process module logic entity 26 associated therewith.

The MTP files containing the interface description 15, the interface description 25 and the process module logic entity 26 can be imported into the orchestration GUI 13. From the process module logic entity 26, a control code for the high-level controller 12 can be derived, the control code reflecting the control logic of the small process module 60. When the actual orchestration is performed in the orchestration GUI 13, the process control system 10 may implement the derived control code in the high-level controller 12.

FIG. 4 shows the apparatus 100 configured according to the procedure described in connection with FIG. 3 in operation. The high-level controller 12 is commutatively connected to the interfaces 51, 61 of the process modules 50, 60, e. g. via a suitable field bus system 70 such as a Profinet bus. The control code for performing the orchestrated services of the big process module 50 is running directly on the internal controller of process module 50, and the communication, via the field bus system 70, between the high-level controller and the big process module 50 mainly comprises an exchange of start/stop commands and a feedback of measurement values. The control code for performing the orchestrated services of the small process module 60 is running remotely on the high-level controller. In FIG. 4, the process control system 10 runs as a part of an orchestration system 14, but is not limited thereto.

Figure 5:
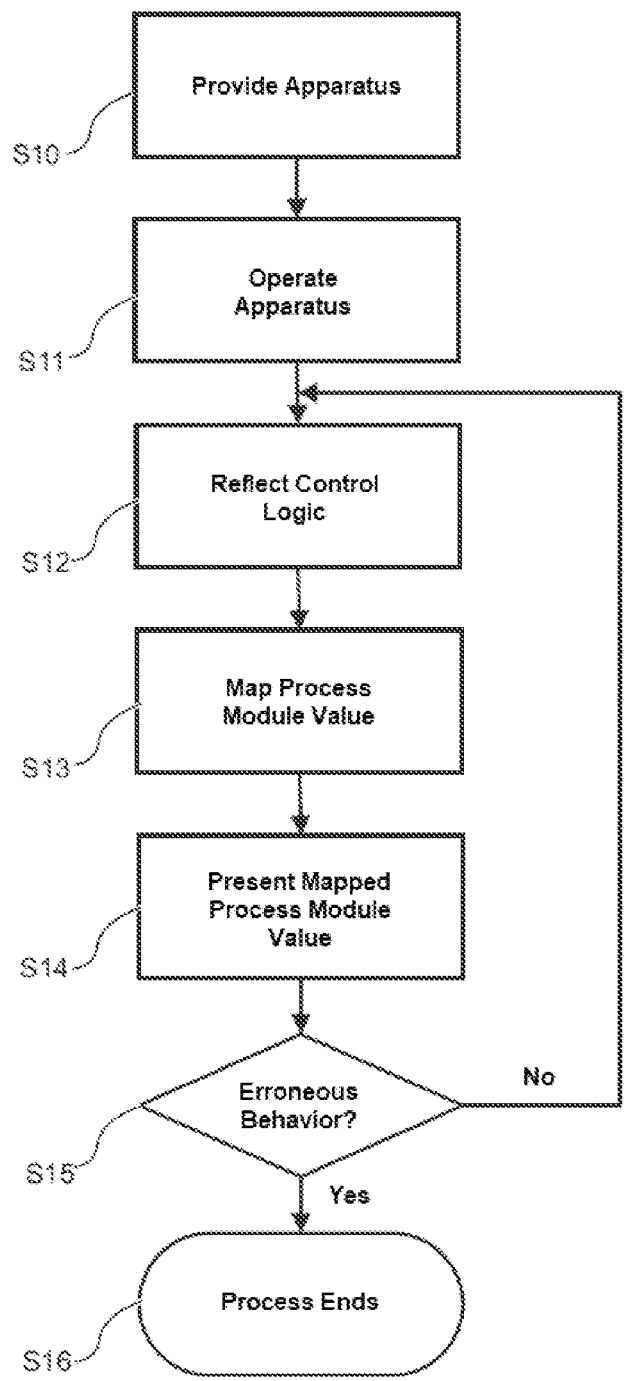
FIG. 5 is a flow chart showing a method reflecting a control logic in a diagnosis procedure.

FIG. 5 shows a flow chart showing a method reflecting a control logic in a diagnosis procedure.

In S10, an apparatus 100 is provided. The apparatus comprises the process control system 10, the at least one process module 50, 60, and the process module logic entity 26 associated with the process module 60. The process module logic entity 26 provides the control logic of the process module 60.

In S11, the apparatus 100 is operated. Typically, the apparatus 100 is an orchestrated modular plant comprising the process modules 50, 60. In S12, the control logic of the process module 60 is reflected by presenting the control logic in a graphical user interface (GUI) of a human machine interface (HMI).

In S13, at least one process module value, typically a real-time value (a live value) of a service running on the process module 60, is mapped to a corresponding part of the control logic in the GUI. Mapping, as used herein, may comprise assigning a visual indication that the process module value belongs to the corresponding part of the control logic.

In S14, the mapped process module value is presented in the control logic of the process module. Presenting, as used herein, may comprise presenting to a user, i. e. via the GUI.

In S15, it is decided whether the respective module behaves erroneously. If in S15, it is decided that the respective module behaves erroneously, a suitable action may be performed, such as replacing the module, annotating a wrong code sequence and sending the annotated code sequence to the module vendor, etc, and the process ends in S16. If in S15, it is decided that the respective module does not behave erroneously, the procedure returns to S12 with another process module.

Figure 6:
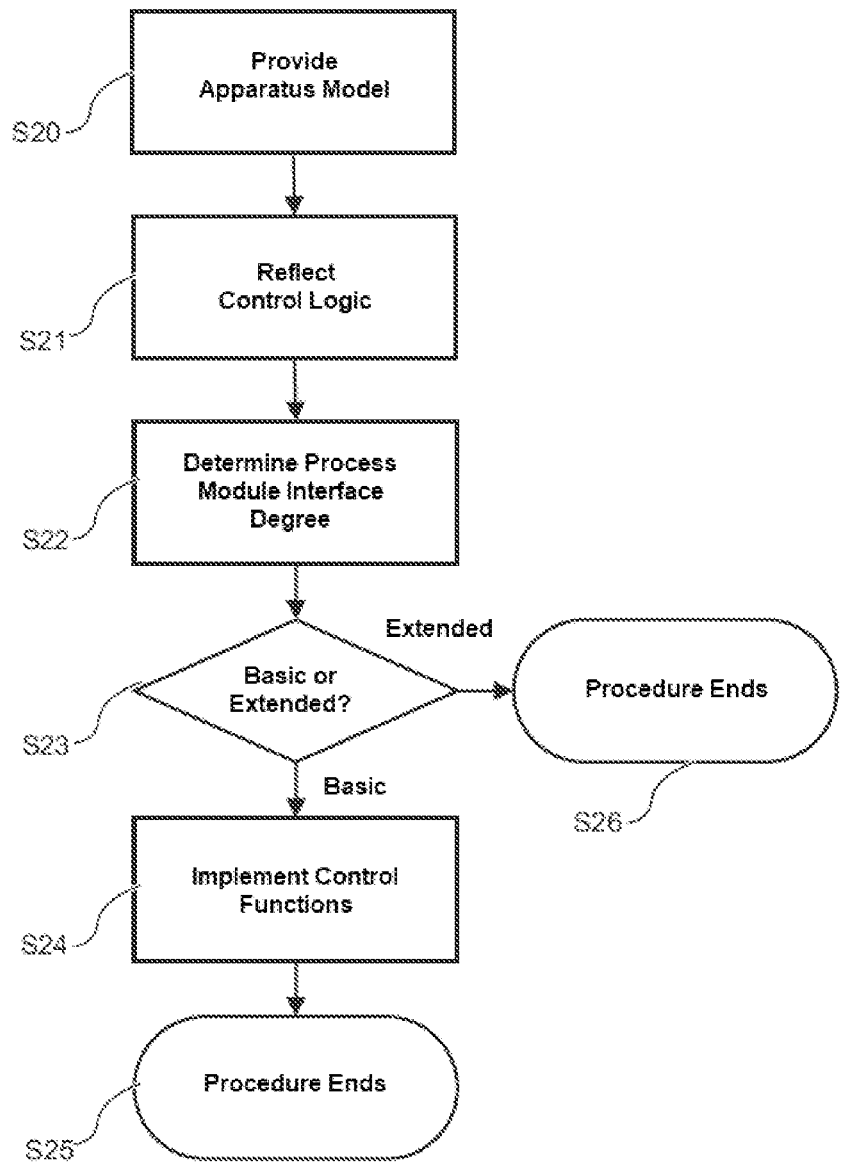
FIG. 6 is a flow chart showing a method reflecting a control logic in a configuration procedure.

FIG. 6 shows a flow chart showing a method reflecting a control logic in a configuration procedure.

In S20, a model of an apparatus 100 is provided. The apparatus 100 comprises the process control system 10, the at least one process module 50, 60, and the process module logic entity 26 associated with the process module 60. The process module logic entity 26 provides the control logic of the process module 60.

In S21, the control logic of the process module 60 is reflected by presenting the control logic in a graphical user interface (GUI) of a human machine interface (HMI).

In S22, a process module interface degree of the process module 60 is determined as a basic interface function or an extended interface function.

In S23, if the process module interface degree has been determined as a basic interface function, control functions that correspond to the control logic of the process module 60 are implemented in the process control system 10 in S24, and the procedure ends in S25. If the process module interface degree has been determined as an extended interface function, the procedure ends directly in S26.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An apparatus, comprising:
 a process control system of an orchestration system, the orchestration system being configured to link a plurality of process modules to one another to obtain a combination of respective services of the plurality of process modules, the process control system comprising an orchestration graphical user interface (GUI) for process module orchestration and a high level controller, the high level controller being configured to remotely operate the plurality of process modules;
 a first process module of the plurality of process modules, the first process module comprising an internal controller and a first process module interface configured to communicate with the process control system; and
 a second process module of the plurality of process modules, the second process module comprising a second process module interface, the second process module not including an internal controller,
 wherein the high level controller is connected to the second process module interface via a field bus system,
 wherein a second interface description for the second process module comprises a module type package (MTP) file having a process module logic entity, the second interface description comprising a specification of the second process module interface, wherein the second interface description having the process module logic entity has been imported into the orchestration GUI, wherein the process module logic entity is configured to derive a control code for the high level controller, the control code reflecting control logic of the second process module, and wherein the high level controller is configured to run, on the high level controller, the control code reflecting control logic of the second process module for performing orchestrated services of the second process module, the orchestrated services comprising start/stop commands to control the second process module.

2. A method of operating an apparatus, the apparatus comprising: a process control system of an orchestration system, the orchestration system being configured to link a plurality of process modules to one another to obtain a combination of respective services of the plurality of process modules, the process control system comprising an orchestration graphical user interface (GUI) for process module orchestration and a high level controller, the high level controller being configured to remotely operate the plurality of process modules; a first process module of the plurality of process modules, the first process module comprising an internal controller and a first process module interface for communication with the process control system; and a second process module of the plurality of process modules, the second process module comprising a second process module interface, the second process module not including an internal controller, wherein the high level controller is connected to the second process module interface via a field bus system, the method comprising:

importing a second interface description for the second process module into the orchestration GUI, the second interface description for the second process module comprising module type package (MTP) file having a process module logic entity, the second interface description comprising a specification of the second process module interface;

deriving, by the process module logic entity, a control code for the high level controller, the control code reflecting control logic of the second process module; and running, on the high level controller, control code reflecting control logic of the second process module for performing orchestrated services of the second process module, the orchestrated services comprising start/stop commands to control the second process module.

3. One or more non-transitory computer readable mediums having processor-executable instructions stored thereon for operating an apparatus, wherein the processor-executable instructions, when executed, facilitate the method of claim 2.

4. The apparatus of claim 1, wherein a first interface description for the first process module is a standard MTP file, and wherein the first interface description comprises a specification of the first process module interface.

5. The apparatus of claim 1, wherein the first process module is configured to run control code for performing orchestrated services of the first process module directly on the internal controller of the first process module, and wherein communication via the field bus system between the high level controller and the first process module comprises an exchange of start/stop commands and a feedback of measurement values.

6. The method of claim 2, further comprising:

providing the first process module with a first interface description, wherein the first interface description is a standard MTP file, and wherein the first interface description comprises a specification of the first process module interface.

7. The method of claim 2, further comprising:

running, by the first process module, control code for performing orchestrated services of the first process module directly on the internal controller of the first process module, wherein communication via the field bus system between the high level controller and the first process module comprises an exchange of start/stop commands and a feedback of measurement values.

* * * * *